Nov. 14, 1933.  J. W. HOOLEY  1,935,561
INSULATED BUSHING FOR CABLES IN CONDUITS
Filed Feb. 7, 1933
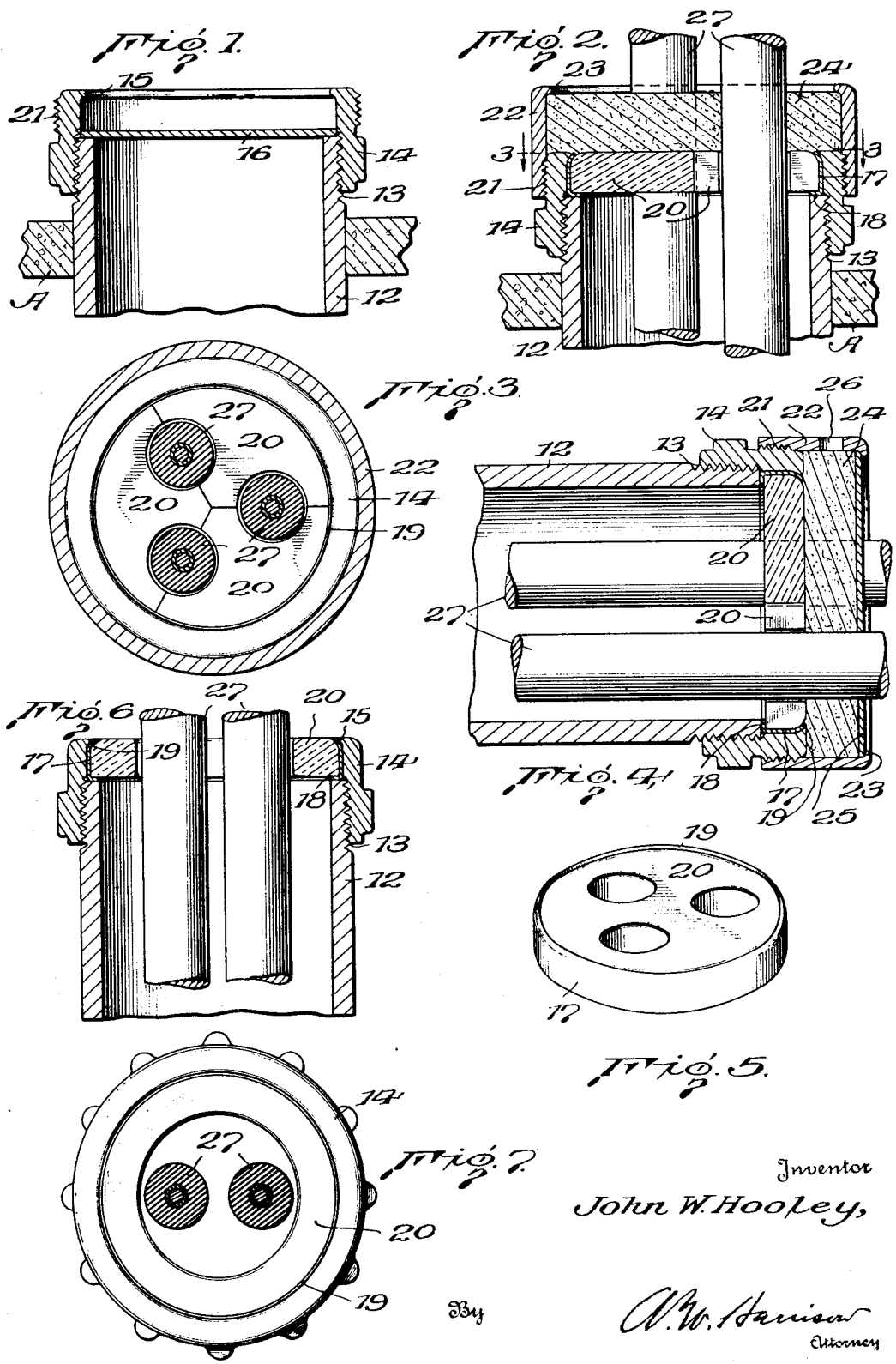
Inventor
John W. Hooley, Patented Nov. 14, 1933

1,935,561

UNITED STATES PATENT OFFICE 1,935,561

INSULATED BUSHING FOR CABLES IN CONDUITS

John W. Hooley, Larchmont, N. Y.

Application February 7, 1933. Serial No. 655,660

6 Claims. (Cl. 247—43)

This invention relates to means for protecting the cables or wires of electric circuits leading through conduits or pipes installed in buildings, and refers particularly to the bushings employed at the ends of the conduits.

Metal bushings, of iron or steel, have been long used on the ends of conduits in the electrical art, with occasional results that the cables, due to pressure or vibration, have become chafed and so worn as to make direct contact with a bushing. This not only is an injury to the cables, but is liable to effect a short circuit, with injury to electrical or mechanical devices in proximity thereto, and is even liable to start a conflagration. Therefore, there has been a trend toward insulated bushings for the ends of cable conduits, but they have been of high commercial cost, and not always of practical design. In the present day insulating bushing, the insulating member of the bushing is moulded to and made a part of the metal portion of the bushing. Consequently, if the insulated portion of the bushing becomes broken or damaged on a job, the whole bushing must be replaced, and if this should occur after cables are pulled in place, the labor cost is enormous and in many cases it would not be practicable because of interruption of electrical service for the reason that the cables might then be in service, the system hooked up, lights burning, motors and other apparatus connected and operating.

One of the objects of my invention is to provide insulated bushings for the ends of cable conduits, which bushings are strong, practical, and economical to produce.

Another object is to provide a bushing the insulating member of which is separable and removable and need only be placed in position at the time of the installation of the cables.

With the above objects in view, and others hereinafter referred to, the invention consists in the construction and combination of parts substantially as hereinafter described and claimed.

Of the accompanying drawing:

Figure 1 is a sectional elevation of some of the parts of my improved structure in a state of partial assembly.

Figure 2 is a sectional elevation of a completely assembled insulated bushing when produced as of pothead structure.

Figure 3 represents a section on line 3—3 of Figure 2.

Figure 4 is a view similar to Figure 2 but illustrating other features employed when the installation is such that the cable conduits are in other than vertical position.

Figure 5 is a perspective view of the insulating member in one of its forms.

Figure 6 is a view similar to Figure 1, but illustrating a bushing member assembled in position.

Figure 7 is a plan view of the assembly shown in Figure 6.

Similar reference characters indicate similar parts or features in all of the views.

The conduit or pipe 12, installed in any structure a part or member of which is indicated at A, has a threaded end 13 to which is removably secured a ring 14 the outer end of which has an inwardly projecting rim 15. Figure 1 illustrates a disk 16 which may be of fiber or any suitable metal. This disk 16 is not a permanent part of the structure, but is removable as will be explained hereinafter.

In the complete structure I supply a metal clamp, ring or sleeve 17 (Figs. 5 and 6) having one margin turned in to provide a flange 18, and the other margin 19 being capable of being turned in to confine and protect, within the ring, the insulating bushing member 20 which, when the assemblage is completed as will be described, constitutes the closure for the end of the conduit 12. Said member 20 may consist of a plurality of sections as illustrated in Figures 2, 3 and 4, or as a single disk having a plurality of apertures (Fig. 5) for the cables, or as a single disk (Figs. 6 and 7) having one large aperture for the cables.

In Figure 1, the outer end of the ring 14 is illustrated as externally threaded at 21, but this is not always necessary. Assuming that the complete insulated bushing consists only of the members so far described, whether the ring 14 has the threads 21 of Figure 1, or has no such threads as illustrated in Figure 6, the ordinary installation thereof will now be described.

After the conduit 12 is installed, the metal or fiber disk 16 and the ring clamp 14 are applied as in Figure 1, the said disk 16 completely closing the end of the conduit so as to prevent the entrance into the conduit of any plaster, cement, dirt, or any other foreign substances which might later, during the drawing in of cables 27, interfere with such drawing in. The members can be left so during further structural work.

When cables 27 are to be drawn in to place, the sleeve or ring 14 is unscrewed and the disk 16 removed, and the desired insulating bushing 20 with its enclosing protecting surrounding ring 17 then placed as shown in Figure 6, and the sleeve 14 screwed back to place so that the rim 15 of said sleeve 14 bears on the rim 19 of the bushing ring 17 and holds the combined bushing 20 and ring 17 firmly against the end of the conduit 12.

It is to be understood, of course, that the members 17 and 20 are preferably furnished or supplied already assembled. When the clamp ring 14 is screwed down, its rim 15 bears on the inwardly turned rim 19 of the ring 17, and acts to firmly hold the bushing 20 on its seat, and said ring 17 protects the bushing against cracking or breakage.

Owing to the fact that the combined bushing 20 and its protective ring 17 is removable and another can be substituted therefor, then if anything happens to it, or if one which has a different number of openings or is of different diameter is needed, the change can be easily made without necessitating replacement of an entire bushing, thus effecting a very material saving in time and cost.

As has been stated, the metal ring 17 which encloses the insulating bushing 20, has one margin turned in to provide a flange 18 to be seated against the end of the conduit, and said ring is of material which enables its other margin, after the disk 20 and the ring 17 are assembled, to be turned in to hold the two members combined as a unit as illustrated in Figure 5. The ring 17 with its inwardly turned margins or rims 18, 19, constitutes a protecting shell for the bushing material 20, and therefore the unit can be safely kept in stock ready for use as illustrated in Figure 5, whether the disk 20 is tightly enclosed by the ring or is slightly loose therein. When the parts are assembled as illustrated in Figure 6, the rim 15 of the threaded sleeve 14 then coacts with the end of the conduit in clamping the unit firmly in place. All of the pressure that is required to maintain the parts in their proper relative positions, is sustained by the metal ring 17 alone, without risk of damage to, or displacement of, the material which comprises the bushing member 20, whether the latter is a single disk (Fig. 5) or a plurality of sections (Fig. 3).

When the members are in place as so far described, the cables 27 may be drawn, in the customary way, without liability of injury due to contact with the end of the conduit.

In practice, on a regular job or piece of construction the size of the conduits is first determined in what is known as the first step in construction, and oftentimes a great space of time elapses between the time when a conduit is installed and the sizes of cables and the number of cables is decided upon. Therefore with my improved bushing including a separable and removable insulating portion, when the sizes of cables and numbers of cables are later decided on, the proper insulating bushing member can be ordered and placed in position without material loss of time, money or inconvenience. This is not possible in present day construction with present type fittings.

Referring now to Figure 2, I have provided additional features whereby further protection is given by means of sealing or pothead insulating material. For this reason, the sleeve 14 is provided with the outer screw threads 21 hereinbefore referred to.

Fitting the screw threads 21 of the sleeve 14, is an extension ring 22 the outer end of which has an inwardly projecting bead 23, the space within said ring providing a chamber for an insulating sealing compound 24 on top of which a disk 25 may be employed as illustrated in Figure 4, in which figure the ring 22 is shown as having a hole 26. The purpose of this structure will now be explained:—

After the cables 27 have been drawn, and all of the parts are in place but with the chamber in the ring 22 empty, a suitable sealing or pothead insulating material 24 is supplied to said chamber. Generally this compound or sealing material is brought to a liquid condition by heating or it may be a plastic material which, when exposed to the air, hardens. This material when set in position while in liquid or plastic form, fills all crevices and takes the contour of the container or receptacle in which it is placed, and when dry or hard effectively and hermetically seals all spaces between the cables, extension ring, insulating disk, bushing clamp, etc., so as to accomplish this purpose. This is generally known in the trade as pothead construction and is used in subways, submarine work, gas houses, chemical plants, or wherever cables may be subject to vapors, gases, moisture, etc., and by cables, I mean to include telephone cables, high tension cables or any and all cables used for electrical, signal or other purposes. Should the conduit be in a horizontal position, or other than a vertical position, a thin insulating disk 25 (Fig. 4) can be used, closing spaces around the cables and engaging under the bead 23 of the ring 22. Then the insulating material or compound 24 can be poured or forced in through the hole 26 where it will successfully fill all openings and effectively seal all spaces as previously referred to, and then when the compound has hardened, the disk 25 can be removed if desired.

While I have illustrated the sleeve 14 as connected to the conduit or pipe 12 by screw threads, and the extension ring 22 as connected to the sleeve 14 by screw threads, it is to be understood that I do not limit myself thereto, as any other suitable connecting means may be employed instead of screw threads, or the ring 22 and sleeve 14 may be made in one piece.

A particular advantage of my improved bushing over present day bushings is that the present day bushing, having the insulating portion attached, is necessarily expensive and the consequent loss or misplacement of the bushing on a job, or any number of bushings, involves a large financial loss to the concern supplying and installing bushings, whereas in my improved bushing the insulating member is separable and removable and need only be placed in position at the time of the installation of the cables.

Having now described my invention, I claim:

1. The combination with a conduit for an electric conductor, of an apertured disk of insulating material having a metal ring surrounding it, both edges of said ring extending inwardly and overlying the margins of both surfaces of the disk, and means for clamping said disk and its ring in position with one of the inwardly extending edges of the ring between the margin of the disk and the end of the conduit.

2. The combination with a conduit for an electric conductor, of an apertured disk of insulating material having a metal ring surrounding it, said ring having an inwardly turned edge overlying the margin of the outer surface of the disk, and a sleeve removably connected with the conduit, said sleeve being detachable from and completely enclosing the margin of the ring and having an inwardly extending rim overlying the said inwardly turned edge of the ring.

3. The combination with a bushing comprising an apertured disk of insulating material and a metal ring surrounding it, both edges of said ring extending inwardly and overlying the margins of both surfaces of the disk, of means for removably connecting said bushing with an end of a conduit, and removable means for confining additional insulating material adjacent to said disk.

4. The combination with a bushing comprising an apertured disk of insulating material and a metal ring surrounding it, both edges of said ring extending inwardly and overlying the margins of both surfaces of the disk, of means for removably connecting said bushing with an end of a conduit, and an extension ring removably mounted in position to hold a filling of additional insulating material.

5. The combination with a sleeve connectible to an end of a cable conduit, of a bushing of insulating material fitting the inside of said sleeve, an extension ring removably connected to the said sleeve for holding a filling of additional insulating material, said extension ring having an inwardly projecting rim at its outer end, and a disk marginally held by said rim for closing off the end of the extension ring.

6. The combination with a sleeve connectible to an end of a cable conduit, of a bushing of insulating material fitting the inside of said sleeve, an extension ring removably connected to the said sleeve for holding a filling of additional insulating material, said extension ring having an inwardly projecting rim at its outer end, and a disk marginally held by said rim for closing off the end of the extension ring, the said extension ring having a hole in a side thereof to enable the space within the ring to be filled with such additional insulating material.

JOHN W. HOOLEY.